United States Patent [19]

Chang et al.

[11] Patent Number: 4,937,736
[45] Date of Patent: Jun. 26, 1990

[54] MEMORY CONTROLLER FOR PROTECTED MEMORY WITH AUTOMATIC ACCESS GRANTING CAPABILITY

[75] Inventors: Albert Chang; John Cocke, both of Austin, Tex.; Mark F. Mergen; Richard R. Oehler, Somers, both of N.Y.

[73] Assignee: International Business Machines Corporation, Armonk, N.Y.

[21] Appl. No.: 126,529

[22] Filed: Nov. 30, 1987

[51] Int. Cl.$^5$ ............................................. G06F 9/00
[52] U.S. Cl. ................................................. 364/200
[58] Field of Search ......................... 364/200 MS File

[56] References Cited

U.S. PATENT DOCUMENTS

| | | | |
|---|---|---|---|
| 3,683,418 | 8/1972 | Martin | 364/200 |
| 4,084,230 | 4/1978 | Matick | 364/200 |
| 4,104,718 | 8/1978 | Poublan et al. | 364/200 |
| 4,177,510 | 12/1979 | Appell et al. | 364/200 |
| 4,410,941 | 10/1983 | Barrow et al. | 364/200 |
| 4,481,573 | 11/1984 | Fukunaga et al. | 364/200 |
| 4,574,350 | 3/1986 | Starr | 364/200 |
| 4,580,217 | 4/1986 | Celio | 364/200 |
| 4,638,426 | 6/1987 | Chang et al. | 364/200 |
| 4,680,700 | 7/1987 | Hester et al. | 364/200 |
| 4,685,088 | 8/1987 | Iannucci | 365/230 |
| 4,698,752 | 10/1987 | Goldstein et al. | 364/200 |

OTHER PUBLICATIONS

"Check On Access Via Hierarchical Block Validation" *IBM Technical Disclosure Bulletin*, vol. 27, No. 7A, Dec. 1984, pp. 3752-3756.

*Primary Examiner*—Gareth D. Shaw
*Assistant Examiner*—John G. Mills
*Attorney, Agent, or Firm*—Thomas E. Tyson

[57] ABSTRACT

A method and apparatus for controlling access to data blocks stored by addresses in a memory and concurrently accessible by a plurality of transactions is provided. The method includes the steps of receiving an address of a data block to be accessed by a first transaction, deriving from the address an access table entry corresponding to the data block where the entry includes lock data that governs access to the data block, and providing the access if permitted by the lock data, or providing the access, if not permitted by the lock data, and recording the occurrence of the access in the lock data.

16 Claims, 5 Drawing Sheets

MEMORY CONTROLLER FOR PROTECTED MEMORY WITH AUTOMATIC ACCESS GRANTING CAPABILITY

TECHNICAL FIELD

This invention relates to data processing and more specifically to controlling access to a protected memory.

BACKGROUND ART

Present data processing applications include the requirement that several tasks be performed concurrently. These tasks require read and write access to data memories in the the data processing systems. Problems occur when these multitask transactions attempt to read and write data in the memory concurrently. These problems arise when the system is attempting to provide transaction concurrency while ensuring that the performance of tasks is performed in a scheduled manner, i.e. that one task is performed before another. These problems are addressed in a paper entitled "Transaction Monitoring ENCOMPASS: Reliable Distributed Transaction Processing", published in the *IEEE Proceedings on Very Large Data Bases*, September 1981, pages 244-254. Furthermore, a U.S. patent application Ser. No. 115,146, entitled "Method for Concurrent Record Access Using an Index Tree", filed Oct. 30, 1987 also addresses the problems of concurrent transaction processing. A locking protocol provides for concurrent access to data in a memory by multiple transactions in a ordered manner. Locking prevents one transaction from accessing a record that is being modified, or owned, by another transaction. This ensures that one transaction will not read a record that is in the process of being changed by another transaction, thus ensuring an ordered interaction between these transactions.

One locking protocol technique is illustrated in U.S. Pat. No. 4,680,700 entitled "Virtual Memory Address Translation Mechanism With Combined Hash Address Table And Inverted Page Table" assigned to the present assignee. Another patent describing memory protection for concurrent transaction operation is U.S. Pat. No. 4,638,426 entitled "Virtual Memory Address Translation Mechanism With Control Data Persistence" also assigned to the present assignee. These two references address the application of locking protocols to virtual address translation. Regulating the access to protected data can be performed while performing the task of translating between the virtual addresses and the real addresses in a virtual memory system. In performing the virtual to real address translation, each addressable data block includes additional data that describes the accessibility of this data by transactions. In other words, the setting of these data bits will determine whether a transaction can access a data block.

The object of the present invention to provide a memory controller that grants access to concurrently executing transactions while protecting the integrity of the data being accessed.

An additional object of the present invention is to provide a memory controller that records the access so granted.

The further objective of the present invention is to provide a memory controller that regulates access to protected data blocks stored in a manner as not to impede the efficiency of concurrent transaction execution.

DISCLOSURE OF THE INVENTION

In accordance with the present invention a method for controlling access to data blocks stored by addresses in a memory and concurrently accessible by several transactions is provided. The method consist of the steps of (a) receiving an address of a data block to be accessed by a first transaction, (b) deriving from the address an access table entry corresponding to the data block, the entry including lock data that governs the access to the data block, and (c) providing the access if permitted by the lock data, or providing the access, if not permitted by the lock data, and recording the occurrence of the access in the lock data.

Also in accordance with present invention is a method for controlling access to data blocks stored by addresses in a memory and concurrently accessible by several transactions wherein the method includes the steps of (a) receiving an address of a data block to be accessed by a first transaction, (b) deriving from the address an access table entry corresponding to the data block where the entry includes lock data that regulates access to the block, and (c) providing access if permitted by the lock data or providing access, if not permitted by the lock data, when the first transaction is a read transaction and all other transactions accessing the data block are also read transactions, or when the first transaction is a write transaction and there are no other transactions accessing the data block.

This invention also provides a mechanism for regulating the access to data blocks in accordance with the previous discussed methods. This regulating apparatus also performs address translation for a virtual memory storage system.

BRIEF DESCRIPTION OF DRAWING

The novel features believed characteristic of the invention are set forth in the appended claims. The invention itself, however, as well as the other features and advantages thereof, will be best understood by reference to the detailed description which follows, read in conjunction with the accompanying drawings, wherein:

BEST MODE FOR CARRYING OUT THE INVENTION

This invention includes a method and apparatus for regulating the access of several concurrently executing transactions to data blocks in a memory. The preferred embodiment includes a virtual memory system. The regulation of access to the data is performed during the process of virtual to real address translation. The mechanisms for performing access in a virtual memory system are disclosed in U.S. Pat. Nos. 4,680,700 and 4,638,426 which are herein incorporated by reference.

Figure 1:
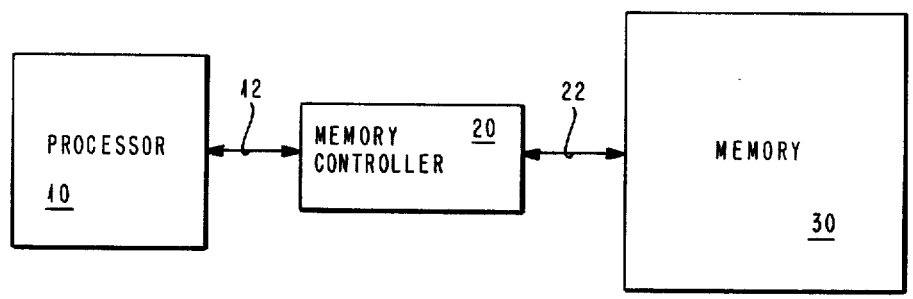
FIG. 1 is a block diagram of a data processing system.

FIG. 1 is a simplified block diagram of data processing system including a processor 10 connected by a bidirectional bus 12 to a memory controller 20 which is connected by a bidirectional bus 22 to a memory 30. In practice, processor 10 can be a single or several processors that are executing program sequences. These programs sequences will include transactions that are executing concurrently and attempting to concurrently access data stored in the memory 30 through the memory controller 20. In this embodiment, the memory controller 20 further performs the virtual to real memory address translation that is described in detail in the above two patent references. Therefore, a detailed description of virtual address translation will not be discussed. However, certain aspects of the virtual address translation will be described to illustrate the regulation of access to data in the invention.

Figure 2:
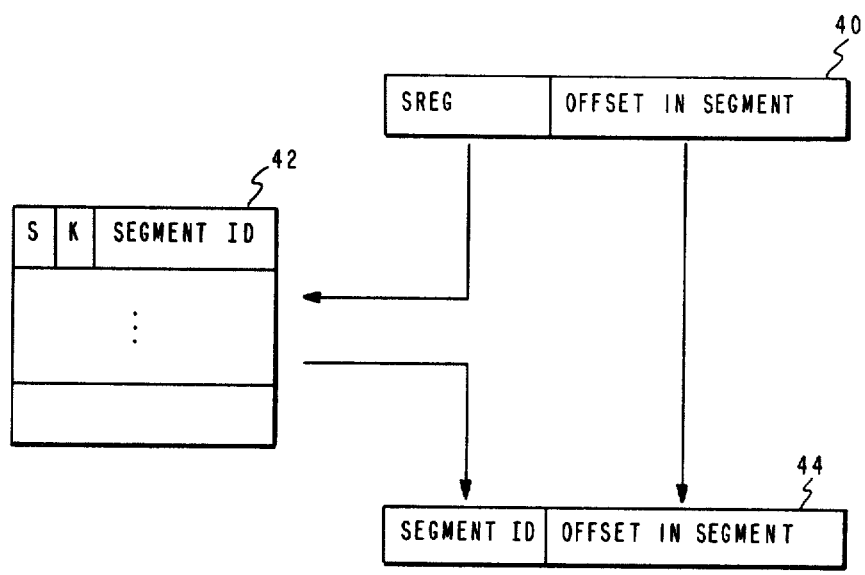
FIG. 2 is an illustration of a short address to long address translation.

In FIG. 2, the generation of a long virtual address from a short address is illustrated. The short address is received from the processor 10 and is to be translated into a real address. In FIG. 2, the short address 40 includes two parts. The first part is a four bit designation of the segment register. The second part is a 28 bit designation of an offset in a segment. The segment register 42, contained in the memory controller 20, includes additional data governing the virtual address translation procedure. One portion of the segment register contents is the segment identifier or segment ID. This is a 24 bit segment ID that is concatenated with the 28 bit offset in the segment portion from the short address to make an overall long virtual address 44. The long virtual address is then translated in a manner illustrated in FIG. 3.

Figure 3:
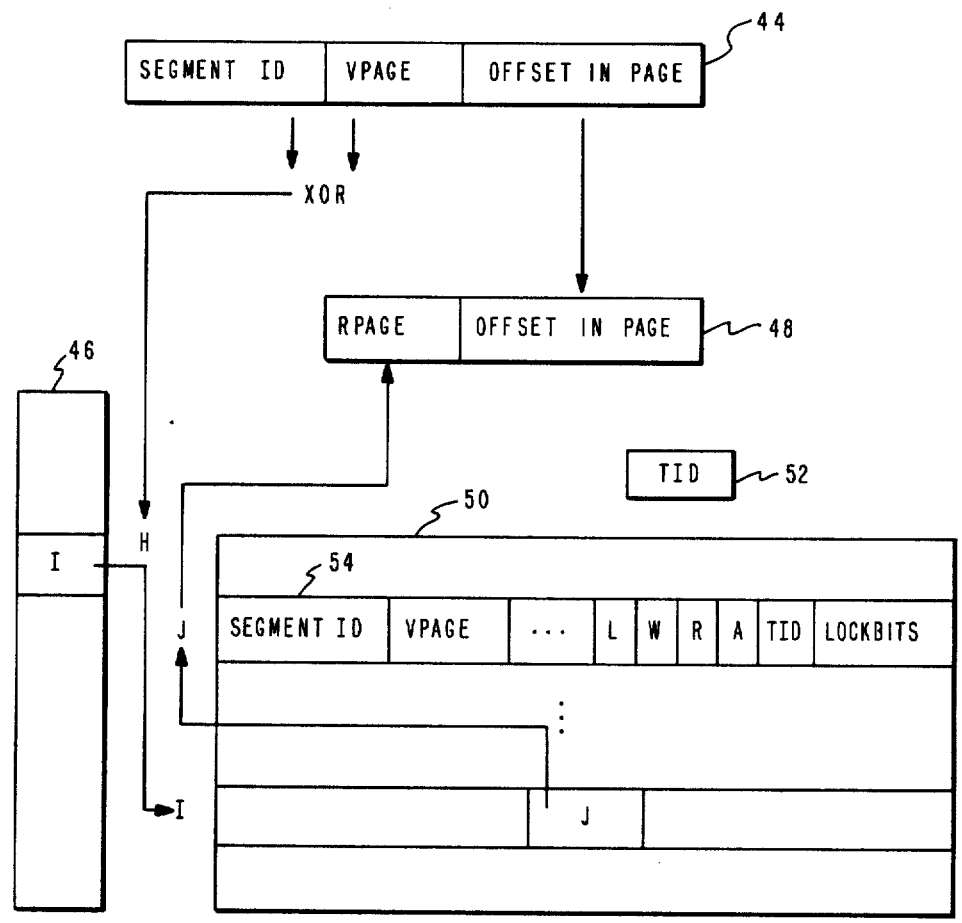
FIG. 3 is a diagram illustrating an inverted page table address translation.

FIG. 3 illustrates the operation of the inverted page table. Again, a detailed explanation of the virtual address translation procedure is described in the two patent references previously discussed. The long virtual address 44 includes the segment ID, and the offset in segment. The offset in the segment portion is divided into an offset in the page portion and a virtual page portion. The segment ID and the virtual page portion are EXCLUSIVE ORed to form an index used to access data in a hash table 46. The output of the hash table 46 is an index used to access the inverted page table 50. The inverted page table 50 includes entries governing the access to the data blocks in the memory. The vpage field in the Kth entry in the inverted page table 50 is equal to the virtual page associated with the Kth real page of memory, and the real address 48 is formed by concatenation as shown in FIG. 3. The memory controller further includes a transaction ID register 52 that contains the identifier of the transaction currently executing on the processor. The entry 54 in the inverted page table includes the segment ID, virtual page designator, the lock bits and several other variables to be discussed. As previously discussed, the lock bits govern the access to the data block by the transaction. If an access is to be allowed, the lock bit for the respective data block will be set to a one. If access is not to be allowed, the lock bit will be set to zero.

The present invention provides a procedure for regulating access to the data blocks in accordance with the lock bits, but also, to provide more efficient concurrent transaction execution, it provides concurrent access to some data blocks even though prohibited by the lock bits. This additional access is provided when the integrity of the data can be guaranteed or when the transaction access will not affect any other accesses. The memory controller 20 (FIG. 1) will use the real address 48 to access data in the memory 30 in accordance with the accessing procedure that is governed by the lock bits in entry 54.

In FIG. 3, line 54 includes the variables l, w, r and a. The variable "l" stands for lock type. This is a one-bit indication whether the lock bits (32 lock bits in line 54) represents write locks or read locks for the data blocks on the page. The variable "a" represents the allow read indication. The allow read indication permits any transaction to read data blocks on the page. The "w" and "r" variables represent the grant write locks and the grant read locks indications respectively. When these lock variables are set, the memory controller will automatically provide access to data blocks and record access granted, without intervention by any supervisory software.

In operation, a transaction will attempt to access a page by providing the long virtual page address which is converted by the memory controller 20 into a real address 48. A function performed by the memory controller reads the entry 54 in the inverted page table during the conversion of the virtual address to the real address. The function grants or denies access on the basis of the entry 54 in the inverted page table and the transaction identifier register 52 which specifies the currently executing transaction. In doing so, the function will ensure that the lock bits for that transaction are such that the transaction has only access as appropriate for it. In other words, this function by using the lock bits will ensure that a transaction will not be granted access, either read or write, to data blocks where such access is inappropriate.

In this embodiment, such a supervisory function is provided. Furthermore, by using the grant read lock and grant write lock indicators, the supervisor may selectively enable an automatic capability for a transaction to access data blocks and automatically record the access in the lock bits. This is accomplished by performing those procedures indicated in the flowcharts in FIGS. 4A and 4B. These procedures are performed by the memory controller while performing the virtual address to real address translation.

Figure 4A:
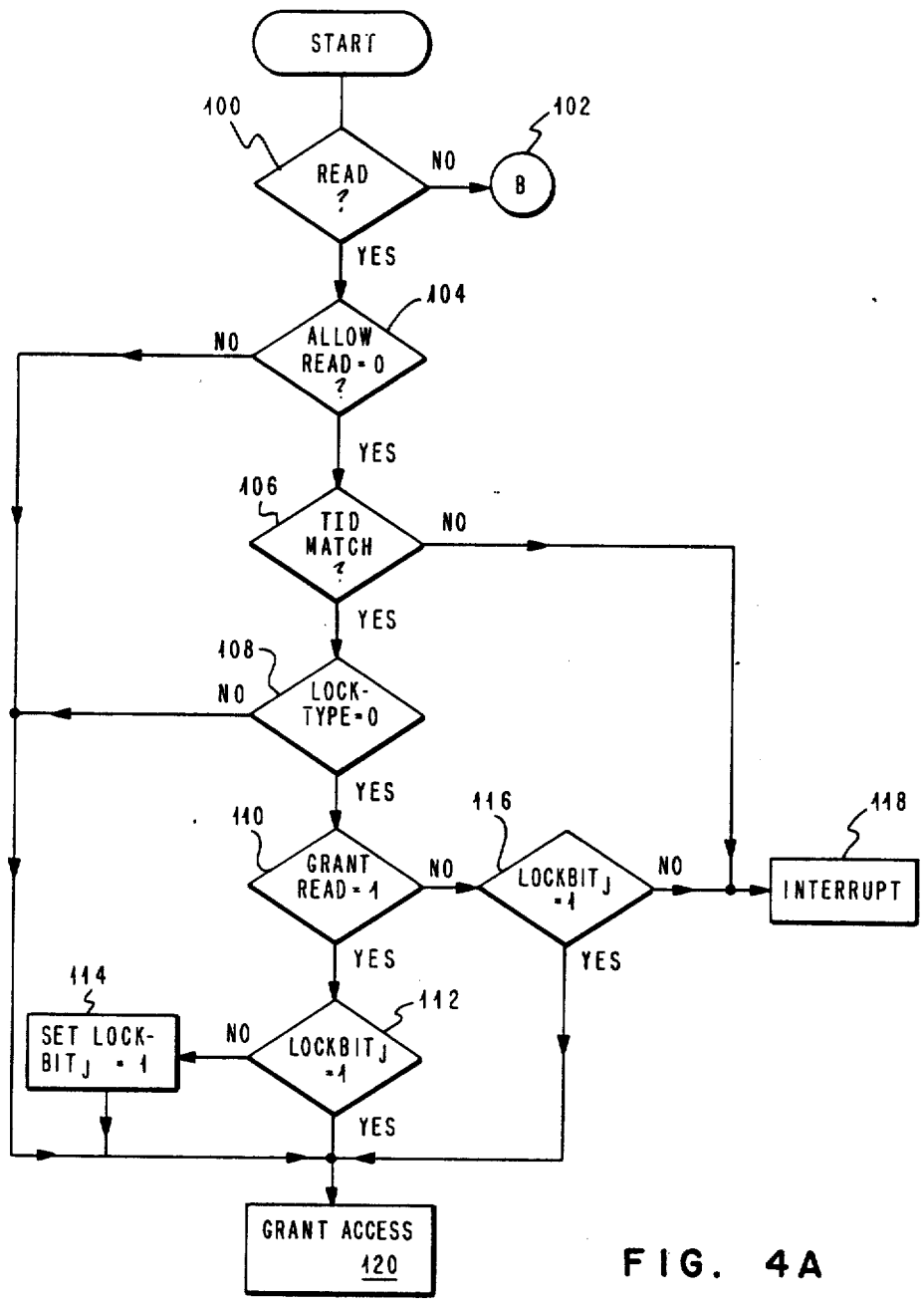
FIG. 4A is a flowchart for the memory controller procedure during a read operation.

In FIG. 4A a flowchart representing the read access is illustrated. Referring to FIG. 4A, the memory controller first determines whether the transaction is a read or write transaction in step 100. If the transaction is a write transaction, the controller proceeds to connector 102 to the flowchart in FIG. 4B. If the transaction is a read transaction, the controller then determines in step 104 if the allow read indicator is set to a zero. If allow read is set to one access granted. If the allow read indicator is a zero, the controller proceeds to step 106 to determine if the transaction ID in the inverted page table 54 matches the transaction ID register 52 contents. If the transaction ID does not match, the controller proceeds to step 118 to deny access and generate an interrupt. If the transaction ID does match, the controller proceeds to step 108 to determine if the lock type equals one or zero. If the lock type equals one indicating that all of the lock bits are write locks, all read accesses are allowed. The controller then proceeds to step 120 to allow the read access. If the lock type is set to zero, the controller proceeds to step 110 to determine the state of the grant read indicator. If the grant read indicator is one, the controller determines in step 112 the status of the lock bit for the data block to be read (in this example the jth data block). If the lock bit is not set, the controller proceeds to step 114 to set the lock bit equal to one for that data block and then proceeds to step 120 to allow access. In step 112, if the lock bit is already set, the controller permits access through step 120. Returning to step 110, if the grant read is set to zero, the controller proceeds to step 116 to determine the state of the lock bit. If the lock bit is set to one, the controller provides access via step 120. If the lock bit is set at zero, the controller proceeds to step 118 to provide an interrupt.

Figure 4B:
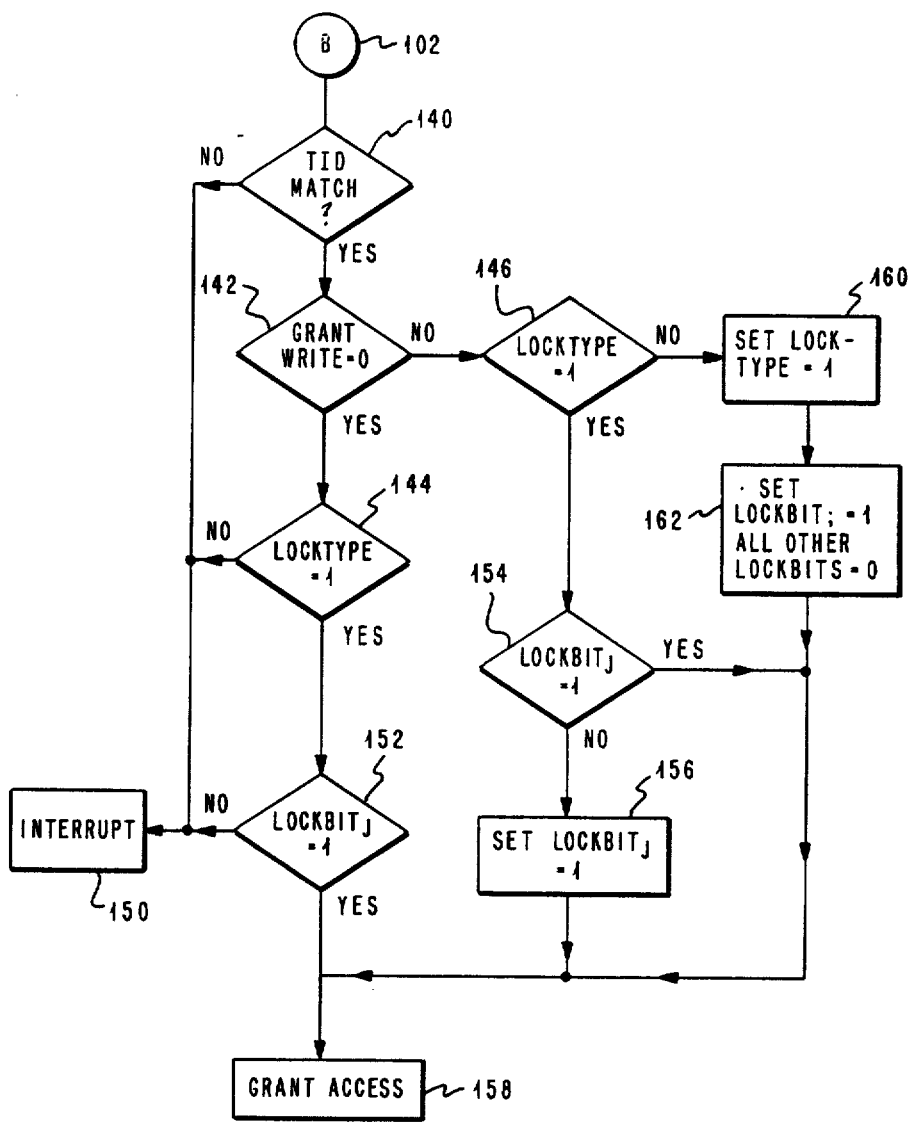
FIG. 4B is a flowchart for the memory controller procedure during a write operation.

Referring to the flow chart in FIG. 4B, the controller proceeds to step 140 through connector 102 to determine if the transaction ID in the inverted page table 54 matches the contents of the transaction ID register 52. If not, an interrupt in step 150 is generated. If there is a match, the controller proceeds to step 142 to determine if the grant write indicator is set. If not, the controller proceeds to step 144 to determine if the lock type is equal to zero. If so, the interrupt is generated in step 150. If not, the controller proceeds to step 152 to determine if the lock bit is set to one. If not, the controller proceeds to step 150 to generate an interrupt. If the lock bit is set to one, the controller proceeds to step 158 to grant write access.

Returning to step 142, if the grant write is set, then the controller proceeds to step 146 to determine if the lock type is set to one. If so, the controller proceeds to step 154 to determine if the lock bit is set to one. If so, the controller grants access in step 158. If not, the lock bit is then set to one in step 156 and the write access is granted in step 158.

Returning to step 146, if the lock type is equal to zero, the controller proceeds to step 160 to set the lock type equal to one. In step 162, the lock bit that is being accessed is set to one and all other lock bits are set to zero. Then in step 158, the write access is granted.

In the flow chart in FIG. 4A, if a lock bit does not grant access but the grant read is set to one, the access will still be granted and the respective lock bit will be changed to record the access. In accordance with this procedure, this recording of the read access to the data block is done automatically without intervention by any supervisory software function. Likewise, in FIG. 4B, if the grant write indicator is set, the write access is allowed even if the lock bits are not set appropriately, and the record of the write access is provided by the automatic setting of these lock bits. Also, if the lock type is not set, the lock type is set to provide write access and thus records the granting of the write access.

While this invention has been described with reference to the illustrated embodiment, this description is not intended to be construed in a limiting sense. Various modifications of the illustrated embodiment as well as other embodiments of the invention will become apparent to those persons skilled in the art upon reference to this description. It is, therefore, contemplated that these appended claims will cover any such modifications or embodiments as fall within the scope of this invention.

We claim:

1. In a data processing system providing for concurrent performance of multiple task operations in a processor, each task operation including at least one transaction where a transaction includes at least one access request to access data blocks in a memory, a method for controlling access to data blocks stored by virtual addresses in a virtual address space in said memory and recording access by concurrent operations, wherein said data blocks are concurrently accessible by a plurality of transactions, said method comprising the steps of:

receiving a virtual address from a task operation in the processor of a data block to be accessed from each access request;

deriving in the processor from said virtual address an access table entry in said memory corresponding to said virtual address, said entry including real address information of the data block to be accessed and lock information;

determining in the processor from said lock information if any access to the data block is to be permitted; and providing in the processor said access to the data block in said memory if permitted by said lock data, if not permitted by said lock data, providing said access with recording of the occurrence of the access by providing the real address information to the memory, and recording that the access occurred in the lock data.

2. A method according to claim 1 wherein said access table entry data includes a first bit indicating permission for read accesses.

3. A method according to claim 2 further including a step of recording the occurrence of a read access granted in response to the first bit.

4. A method according to claim 2 wherein said access table entry data includes a second bit indicating permission for write accesses.

5. A method according to claim 4 further including a step of recording the occurrence of a write access granted in response to the second bit.

6. A method according to claim 2 wherein said access table entry data includes a third bit indicating permission for all read accesses and to not record the occurrence of the read access.

7. A method according to claim 2 wherein said access table entry data includes a fourth bit indicating whether the lock information is permitting read or write access to the data block in memory.

8. In a data processing system providing for concurrent performance of multiple task operations in a processor, each task operation including at least one transaction where a transaction includes at least one access request to access data blocks in a memory, a memory controller connecting a processor and said memory for controlling access to data blocks stored by virtual addresses in a virtual address memory space in said memory and recording access by concurrent operations, wherein data blocks are concurrently accessible by a plurality of transactions, said controller comprising:

means for receiving a virtual address from a task operation in the processor of a data block from each access request;

means for deriving in the processor an access table entry in said memory corresponding to said virtual address, said deriving means including means for forming a real address from said virtual address for accessing said data block from said memory, and said access table entry including lock data used by said deriving means for determining in said processor if an any access to the data block is to be permitted; and means for providing in said processor said access to the data block in said memory if permitted by said lock data, or if not permitted by said lock data, providing said access with recording of the occurrence of the access by providing said real address to said memory, and recording that the access occurred in the lock data.

9. A memory controller according to claim 8 wherein said providing means includes means for selectively inhibiting said means for providing access irregardless of the lock information.

10. A memory controller according to claim 9 wherein said selectively inhibiting means includes means to decode data in said access table entry for said virtual memory address.

11. A memory controller according to claim 10 wherein said access table entry data includes a first bit indicating to the memory controller to permit read accesses to said data block.

12. A memory controller according to claim 11 further including means for recording in said lock information a read access in response to the first bit.

13. A memory controller according to claim 12 wherein said access table entry data includes a second bit indicating to the memory controller to permit write accesses.

14. A memory controller according to claim 13 further including means for recording in said lock information a write access in response to the second bit.

15. A memory controller according to claim 14 wherein said access table entry data includes a third bit indicating to the memory controller to permit all read accesses and not to record in the lock information the read access.

16. A memory controller according to claim 15 wherein said access table entry data includes a fourth bit indicating whether lock information in said entry is for permitting read or write access.

* * * * *